US 12,447,995 B2

(12) United States Patent
Suehiro et al.

(10) Patent No.: US 12,447,995 B2
(45) Date of Patent: Oct. 21, 2025

(54) SERVER DEVICE, CONTROL CIRCUIT, STORAGE MEDIUM, AND TRAFFIC SUPPORT METHOD

(71) Applicant: Mitsubishi Electric Corporation, Tokyo (JP)

(72) Inventors: Takeshi Suehiro, Tokyo (JP); Kenichi Nakura, Tokyo (JP); Shusaku Umeda, Tokyo (JP); Mari Ochiai, Tokyo (JP); Teruko Fujii, Tokyo (JP); Takashi Asahara, Tokyo (JP); Masaaki Takeyasu, Tokyo (JP); Akiko Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 235 days.

(21) Appl. No.: 18/200,100

(22) Filed: May 22, 2023

(65) Prior Publication Data
US 2023/0311941 A1 Oct. 5, 2023

Related U.S. Application Data

(63) Continuation of application No. PCT/JP2020/045162, filed on Dec. 4, 2020.

(51) Int. Cl.
*H04W 4/44* (2018.01)
*B60W 60/00* (2020.01)
*G08G 1/01* (2006.01)

(52) U.S. Cl.
CPC ......... *B60W 60/001* (2020.02); *G08G 1/0133* (2013.01)

(58) Field of Classification Search
CPC ... B60W 60/001; G08G 1/0133; G08G 1/093; G08G 1/096725; G08G 1/096741;
(Continued)

(56) References Cited

U.S. PATENT DOCUMENTS 11,238,738 B2 2/2022 Ichimaru et al.
2016/0014044 A1\* 1/2016 Mangin ................ H04L 47/724
370/329
(Continued)

FOREIGN PATENT DOCUMENTS

CN 110419070 A 11/2019
CN 110519776 A 11/2019
(Continued)

OTHER PUBLICATIONS

ETSI GS MEC 003 V2.1.1 (Jan. 2019), "Multi-access Edge Computing (MEC); Framework and Reference Architecture", Jan. 2019, total 21 pages.
(Continued)

*Primary Examiner* — Daniel M. Robert
(74) *Attorney, Agent, or Firm* — Birch, Stewart, Kolasch & Birch, LLP

(57) ABSTRACT

A server device includes a support information generation unit, a condition determination unit, and a resource calculation unit. The support information generation unit generates support information for each support-provided area using information from a communication terminal. The condition determination unit determines a support information generation condition being a condition concerning the support information to be generated by the support information generation unit, based on area situation information representing a situation thereof. The resource calculation unit calculates, based on the support information generation condition, amounts of calculation resource and amounts of communication resource of each support-provided area not to cause a sum of the amounts of calculation resource required in each support-provided area and a sum of the amounts of communication resource for use between the server device and a mobile terminal, to exceed total calcu-
(Continued)

lation/communication resource upper limit values available in all the support-provided areas.

12 Claims, 8 Drawing Sheets

(58) Field of Classification Search
CPC .......... G08G 1/096775; G01C 21/3492; G01C 21/3685; H04W 4/44; H04W 28/0226; H04W 28/0289; H04W 28/0861
See application file for complete search history.

(56) References Cited

U.S. PATENT DOCUMENTS

| | | | |
|---|---|---|---|
| 2018/0122237 A1* | 5/2018 | Nascimento | ..... G08G 1/096758 |
| 2019/0384319 A1 | 12/2019 | Sakagami et al. | |
| 2020/0005644 A1* | 1/2020 | Ichimaru | .......... G08G 1/096775 |
| 2022/0028254 A1* | 1/2022 | Ogawa | ............. G08G 1/096716 |
| 2022/0110134 A1* | 4/2022 | Wang | .................... H04W 72/56 |
| 2023/0204365 A1* | 6/2023 | Ishida | .................. G06Q 10/047 |
| | | | 701/422 |

FOREIGN PATENT DOCUMENTS

| | | | | |
|---|---|---|---|---|
| CN | 110606081 A | | 12/2019 | |
| CN | 110035410 B | * | 7/2021 | ......... G06F 9/44594 |
| JP | 2015-72651 A | | 4/2015 | |

OTHER PUBLICATIONS

ETSI GS NFV 002 V1.2.1 (Dec. 2014), "Network Functions Virtualisation (NFV); Architectural Framework", Dec. 2014, total 21 pages.
International Search Report (PCT/ISA/210), issued in PCT/JP2020/045162, dated Jan. 12, 2021.
Chinese Office Action issued in Chinese Application No. 202080107410.X, mailed Mar. 13, 2025, with English translation.

* cited by examiner

FIG.4

| AREA SITUATION INFORMATION | STATE IN AREA SITUATION INFORMATION | SUPPORT INFORMATION GENERATION CONDITION CANDIDATE |
|---|---|---|
| CROWDEDNESS OF MAIN LANE | 0 | DYNAMIC INFORMATION: (1 s, 100 ms)<br>CONTROL INFORMATION: (0, 0) |
| | LOW TO MIDDLE | DYNAMIC INFORMATION: (100 ms, 100 ms)<br>CONTROL INFORMATION: (100 ms, 100 ms) |
| | HIGH (CONGESTION) | DYNAMIC INFORMATION: (1 s, 1 s)<br>CONTROL INFORMATION: (0, 0) |

FIG.5

| | | WHETHER THERE IS SPECIAL-PURPOSE VEHICLE | |
|---|---|---|---|
| | | NO | YES |
| CROWDEDNESS OF PARKING LOT | LOW | DYNAMIC INFORMATION: (0, 1 s)<br>CONTROL INFORMATION: (0, 0) | DYNAMIC INFORMATION: (1 s, 1 s)<br>CONTROL INFORMATION: (1 s, 1 s) |
| | HIGH | DYNAMIC INFORMATION: (100 ms, 100 ms)<br>CONTROL INFORMATION: (1 s, 1 s) | DYNAMIC INFORMATION: (100 ms, 100 ms)<br>CONTROL INFORMATION: (1 s, 1 s) |

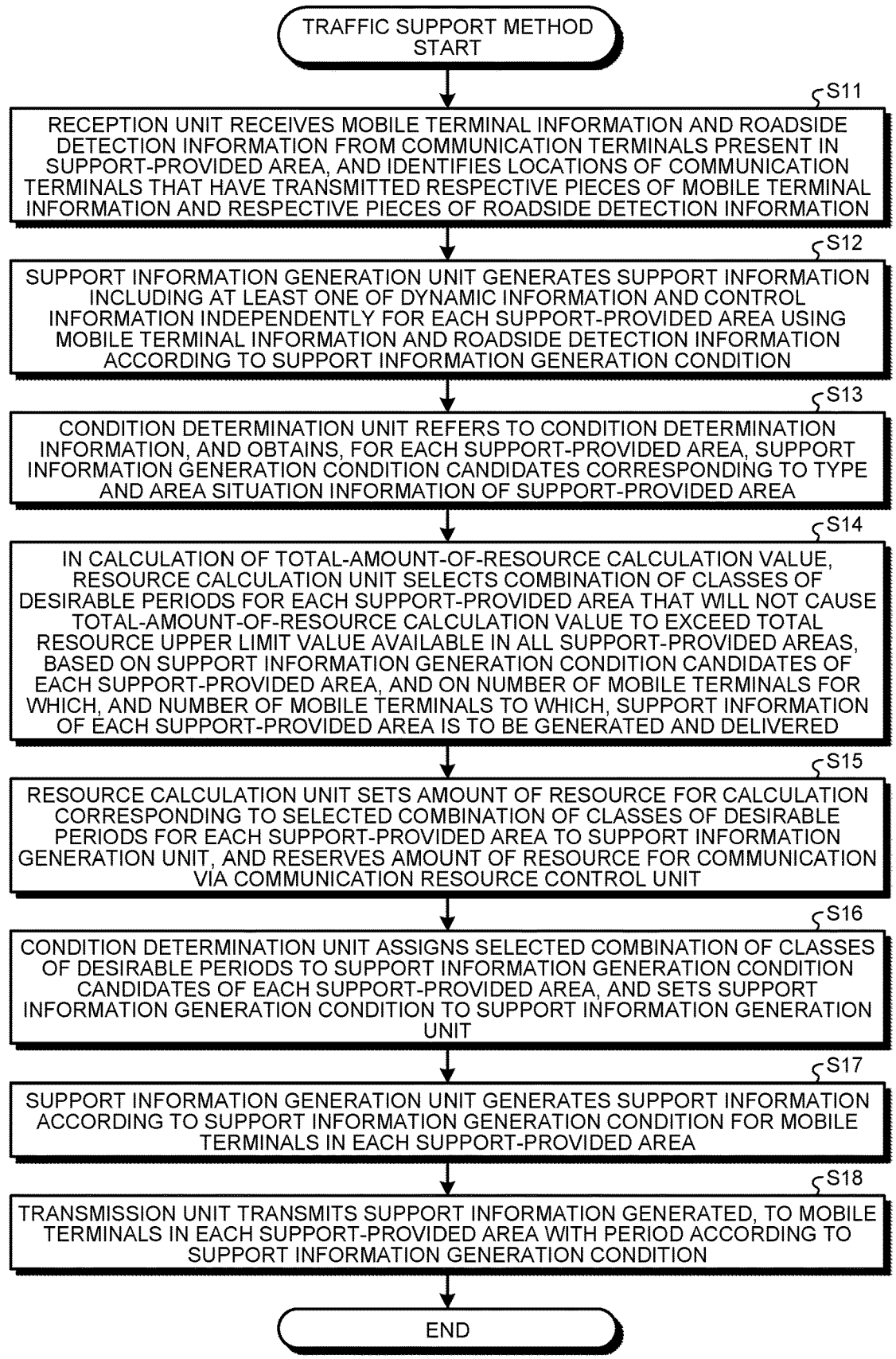

SERVER DEVICE, CONTROL CIRCUIT, STORAGE MEDIUM, AND TRAFFIC SUPPORT METHOD

CROSS-REFERENCE TO RELATED APPLICATION

This application is a continuation application of International Application PCT/JP2020/045162, filed on Dec. 4, 2020, and designating the U.S., the entire contents of which are incorporated herein by reference.

BACKGROUND OF THE INVENTION

1. Field of the Invention

The present disclosure relates to a server device that generates information relating to traffic support using information from a communication terminal, and delivers the information generated, to the communication terminal, and also relates to a control circuit, a storage medium, and a traffic support method.

2. Description of the Related Art

Automatic driving systems have been being developed for improvement in convenience and in safety and for smoothing traffic flows. Automatic driving systems are classified into those of an autonomous type and those of a coordinative type. Those of an autonomous type allow a self-driving vehicle to run through learning the surroundings using only sensors installed on that vehicle, while those of a coordinative type use communication between vehicles or between a wayside device and a vehicle. A study is being conducted with respect to an automatic driving system of the coordinative type among these, on providing support for running of a self-driving vehicle by providing, from a management server that has collected and processed various types of information, information about an object present in a blind spot of a vehicle and information about a road traffic condition at a distant location out of line-of-sight, as well as travel route information recommended, or use of which is requested, for the self-driving vehicle.

Japanese Patent Application Laid-open No. 2015-072651 proposes a traffic control system including a management server that generates route information, which is information about the route to be traveled by a self-driving vehicle, and provides the route information to the self-driving vehicle when the self-driving vehicle and a manually driving vehicle are both present in a support-provided area, in which information about traffic can be provided to a mobile terminal. The management server included in the traffic control system described in Japanese Patent Application Laid-open No. 2015-072651 manages the self-driving vehicle and the manually driving vehicle present in the area, and generates the route information based on vehicle information received from the self-driving vehicle and from the manually driving vehicle, on map information of the area, and on information from sensors installed for observing the inside of the area.

Meanwhile, an automatic driving system of the coordinative type such as the traffic control system described in Japanese Patent Application Laid-open No. 2015-072651 requires the management server to have a small delay characteristic. Thus, one possible measure in a case of a mobile network is, for example, to use an edge server as the management server. An edge server is a server device disposed near an edge of a communication network between, for example, a base station and a core network. In this case, each of edge servers is typically expected to be configured to cover multiple support-provided areas. In addition, it is expected that edge servers are not installed on an application-by-application basis, but multiple applications sharing a network operate on each of the edge servers. On the other hand, an edge server has a restriction on the amount of calculation resource due to factors such as a limitation of installation space, and also has a restriction on the amount of communication resource provided in the network infrastructure. This presents a problem in that the traffic control system described in Japanese Patent Application Laid-open No. 2015-072651 may cause network congestion, thereby imposing a high load on the management server.

SUMMARY OF THE INVENTION

To solve the problem and achieve the object described above, a server device of the present disclosure is a server device connected to one or more base stations to deliver support information to a mobile terminal in a support-provided area, where the support information is information about traffic, the mobile terminal includes a vehicle having wireless communication capability, and the one or more base stations each have a coverage including the support-provided area, which is an area in which the support information is provided to the mobile terminal. The server device includes a support information generation unit, a condition determination unit, and a resource calculation unit. The support information generation unit generates the support information independently for each of the support-provided areas using information from a communication terminal present in each corresponding one of the support-provided areas. The condition determination unit determines a support information generation condition, i.e., a condition with respect to the support information to be generated and delivered by the support information generation unit, based on area situation information representing a situation of each corresponding one of the support-provided areas. The resource calculation unit calculates and reserves, based on the support information generation condition, amounts of calculation resource and amounts of communication resource of respective ones of the support-provided areas that does not cause a sum of the amounts of calculation resource required in the respective ones of the support-provided areas and a sum of the amounts of communication resource for use between the server device and the mobile terminal to which the support information is to be delivered, to respectively exceed a total calculation resource upper limit value and a total communication resource upper limit value each available in all the support-provided areas.

BRIEF DESCRIPTION OF THE DRAWINGS

FIG. 4 is a diagram illustrating an example of condition determination information included in a condition determination unit of the edge server according to the first embodiment;

FIG. 5 is a diagram illustrating an example of condition determination information included in the condition determination unit of the edge server according to the first embodiment;

FIG. 6 is a flowchart illustrating an example of procedure of a traffic support method for use in the edge server according to the first embodiment;

DETAILED DESCRIPTION OF THE PREFERRED EMBODIMENTS

A server device, a control circuit, a storage medium, and a traffic support method according to embodiments of the present disclosure will be described in detail below with reference to the drawings.

First Embodiment

Figure 1:
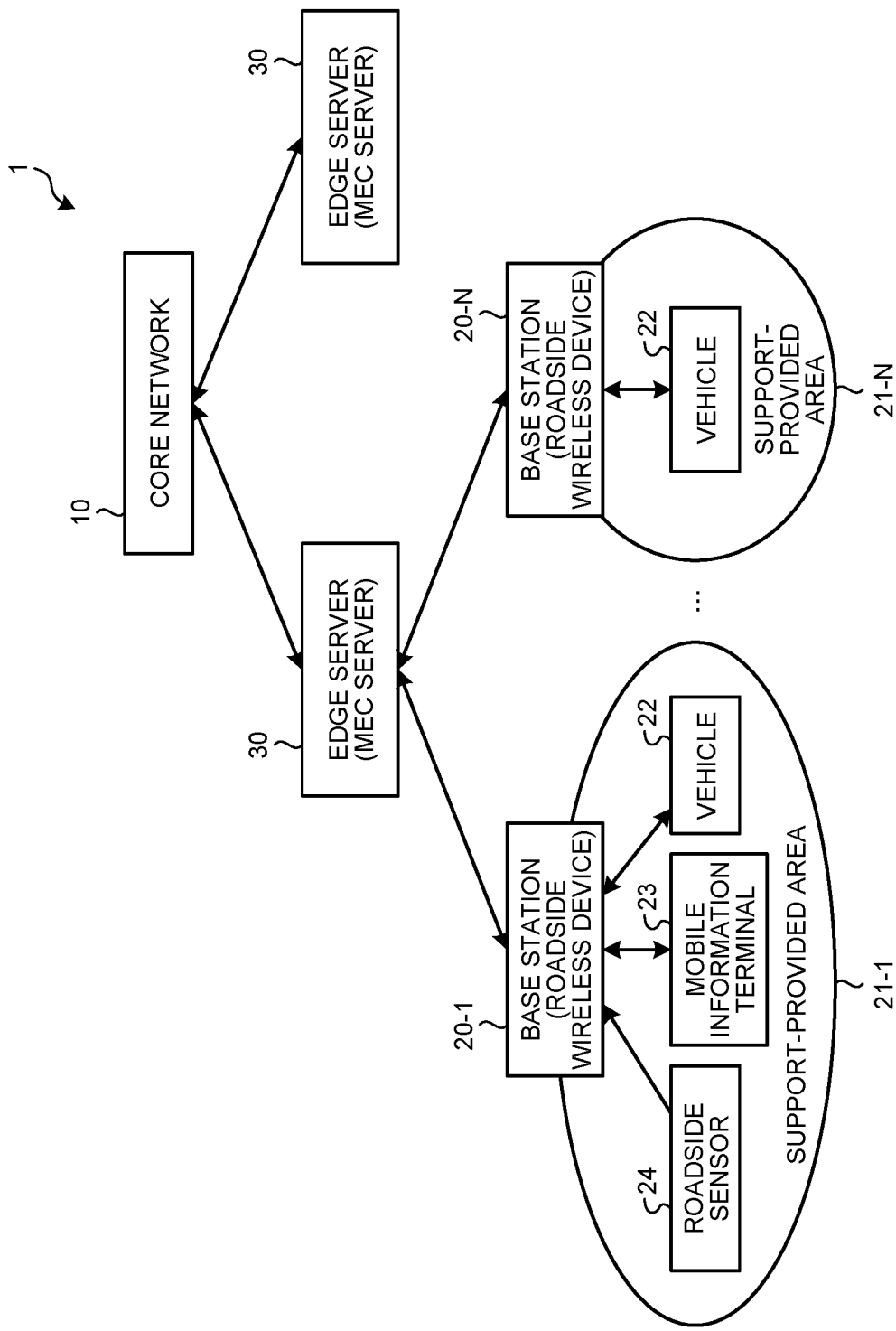
FIG. 1 is a diagram illustrating an example of system configuration of a traffic support system including an edge server according to a first embodiment.

FIG. 1 is a diagram illustrating an example of system configuration of a traffic support system including an edge server according to a first embodiment. A traffic support system 1 includes one or more base stations 20-1, . . . , 20-N and at least one edge server 30, where N is a natural number. The edge server 30 serves the one or more base stations 20-1, . . . , 20-N. The edge server 30 is connected to a core network 10. Note that when no specific distinction is made between the base stations 20-1, . . . , 20-N, the base stations 20-1, . . . , 20-N will each be described as base station 20.

The base station 20 is installed by the roadside to wirelessly communicate with a communication terminal present in a coverage, which is an area in which the base station 20 is wirelessly communicable with another communication terminal. An example of the base station 20 is a roadside wireless device. The base station 20 relays a communication between a communication terminal in the coverage and the edge server 30. The base station 20 is provided to have a coverage of the base station 20 including support-provided areas 21-1, . . . , 21-N. The support-provided areas 21-1, . . . , 21-N are areas that are predetermined, and each are an area in which information about traffic is provided to a vehicle 22 having wireless communication capability or to a pedestrian carrying a mobile information terminal 23, and also an area in which the vehicle 22 or the pedestrian carrying the mobile information terminal 23 is supported in moving therein. The support-provided areas 21-1, . . . , 21-N each have a type including, but not limited to, a parking lot; a crossing of local roads; and a merging point, a tollgate, and a section of frequent spontaneous traffic jams in an expressway. When no specific distinction is made between the support-provided areas 21-1, . . . , 21-N, the support-provided areas 21-1, . . . , 21-N will each be described below as support-provided area 21.

Examples of the communication terminal include the vehicle 22, which has wireless communication capability and moves around in the support-provided area 21, the mobile information terminal 23 carried by a pedestrian or the like, and a roadside sensor 24 installed by the roadside to observe an inside of the support-provided area 21. Examples of the vehicle 22 include an automobile, a motorcycle, a bicycle, and the like. The vehicle 22 having wireless communication capability and the mobile information terminal 23 are hereinafter referred to as mobile terminal. In addition, the vehicle 22 and the pedestrian carrying the mobile information terminal 23 are examples of a movable object. Examples of the movable object also include a pedestrian who is not carrying the mobile information terminal 23 and an animal.

In the example of FIG. 1, the base station 20-1 is provided to have a coverage of the base station 20-1 in which the support-provided area 21-1 is included. The support-provided area 21-1 includes the vehicle 22, the mobile information terminal 23, and the roadside sensor 24. The base station 20-N is provided to have a coverage of the base station 20-N in which the support-provided area 21-N is included. The support-provided area 21-N includes the vehicle 22.

Each of the mobile terminals transmits mobile terminal information including the state of that mobile terminal to the edge server 30 via the base station 20 serving that mobile terminal. The mobile terminal information includes the location, the velocity, and the size of that mobile terminal, type information of the movable object, and environmental information including the weather and the brightness at the location of that mobile terminal. The type information of the movable object is information indicating whether the movable object is a pedestrian carrying the mobile information terminal 23 or the vehicle 22. When the mobile terminal is the vehicle 22, the mobile terminal information may further include type information and state information of the vehicle 22, or control information of the inside of the vehicle 22. The type information of the vehicle 22 is information indicating whether the vehicle 22 is a special-purpose vehicle such as an emergency vehicle or a priority vehicle, or a general-purpose vehicle other than special-purpose vehicle. The state information of the vehicle 22 is information indicating, by way of example, whether the vehicle 22 is a self-driving vehicle or a manually driving vehicle. The control information of the inside of the vehicle 22 includes, by way of example, the accelerator position, the brake operation state, the steering angle, and/or the like. In addition, the mobile terminal information may include sensing data detected by a sensor installed in that mobile terminal. In one example, the location and velocity of the mobile terminal, the brightness, and the like may be sensing data.

The roadside sensor 24 transmits roadside detection information including sensing data detected, to the edge server 30 via the base station 20 serving the roadside sensor 24. The roadside detection information includes identification information for identifying the roadside sensor 24, the number of movable objects and the type of each of these movable objects present in a detection area of the roadside sensor 24, environmental information including the weather and the brightness at the location of the roadside sensor 24, and the state information of the vehicle 22 when the movable object is the vehicle 22. The state information is information indicating whether the vehicle 22 is a self-driving vehicle or a manually driving vehicle, and is obtainable, in one example, by the roadside sensor 24 through communication with the vehicle 22. Note that the communication network between the base station 20 and a communication terminal is not limited to a mobile network. In one example, the roadside sensor 24 may be connected directly to the base station 20 via a wired network without using a wireless network.

The edge server 30 is a server device connected between the one or more base stations 20 and the core network 10.

This example assumes that the edge server 30 is a multi-access edge computing (MEC) server, which is being standardized by European Telecommunications Standards Institute (ETSI). Specifically, the edge server 30 is a unit that generates support information based on the mobile terminal information received from the mobile terminals including the vehicle 22, and on the roadside detection information received from the roadside sensor 24, and delivers the support information to mobile terminals in an applicable one of the support-provided areas 21, where the support information is information for providing support with respect to traffic for each of the support-provided areas 21. To generate and deliver the support information as promptly as possible, the edge server 30 is preferably connected to a physically near one or ones of the base stations 20.

Figure 2:
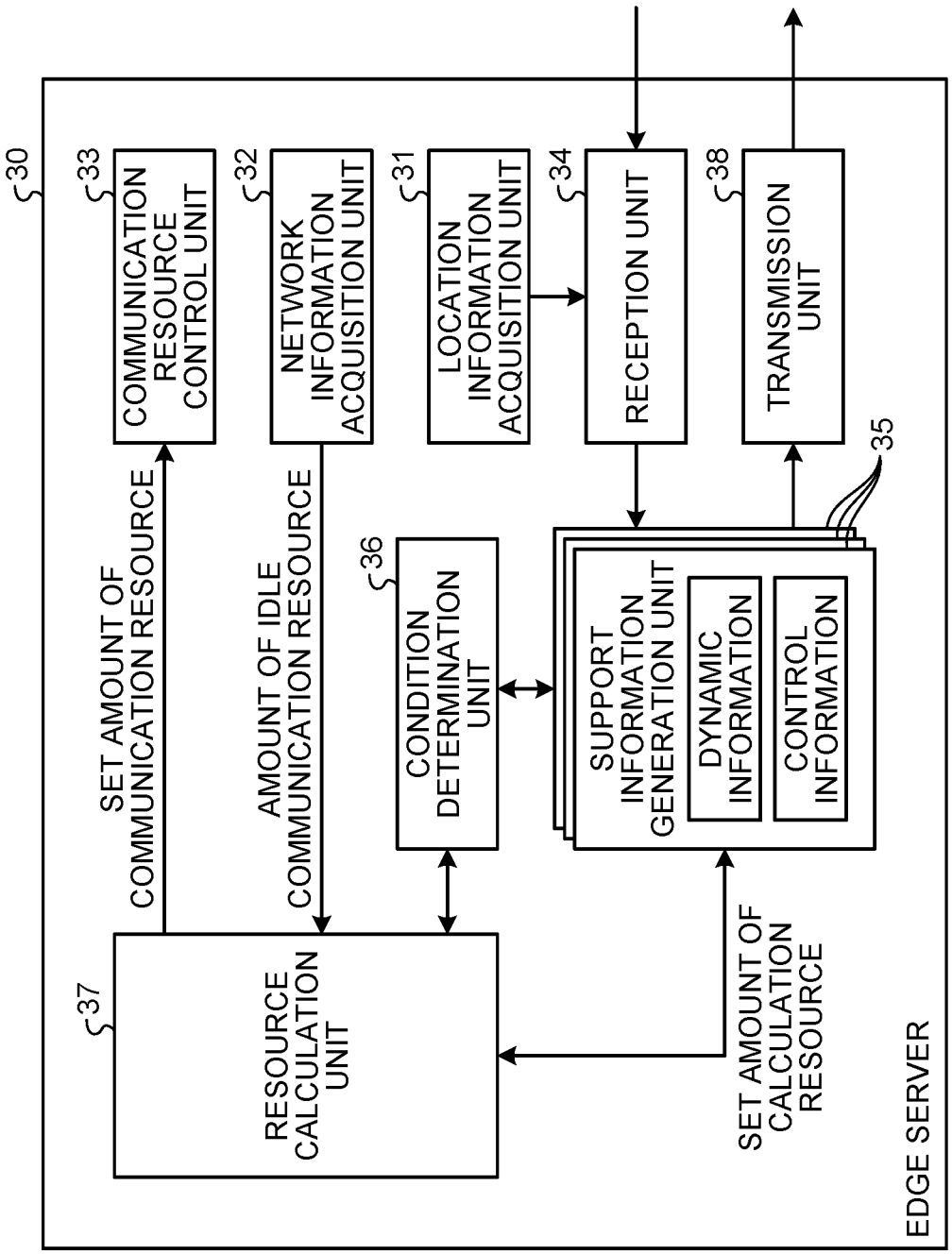
FIG. 2 is a block diagram illustrating an example of functional configuration of the edge server according to the first embodiment.

FIG. 2 is a block diagram illustrating an example of functional configuration of the edge server according to the first embodiment. The edge server 30 includes a location information acquisition unit 31, a network information acquisition unit 32, a communication resource control unit 33, a reception unit 34, a set of support information generation units 35, a condition determination unit 36, a resource calculation unit 37, and a transmission unit 38. Note that an application other than applications constituting the traffic support system 1 according to the first embodiment may also run on the edge server 30, but FIG. 2 illustrates no functional units other than the functional units of applications in relation to generation and delivery of the support information.

The location information acquisition unit 31 obtains information about the location (location information) of a communication terminal. The location information acquisition unit 31 corresponds to Location Service defined as a standard function of an MEC server.

The network information acquisition unit 32 obtains information of communication status of the network. An example of the information of communication status of the network is the amount of idle communication resource for communication of the network. The network information acquisition unit 32 corresponds to Radio Network Information Service/Fixed Access Information Service/Wireless LAN Information Service each defined as a standard function of an MEC server.

The communication resource control unit 33 reserves a communication resource, i.e., a connection and a bandwidth between the edge server 30 and a communication terminal. Specifically, the communication resource control unit 33 sets an amount of communication resource including a bandwidth and a delay for each specific communication traffic. The communication resource control unit 33 corresponds to Traffic Management Service defined as a standard function of an MEC server.

Note that the functional units included in the edge server 30 are capable of using the functionality of the location information acquisition unit 31, of the network information acquisition unit 32, or of the communication resource control unit 33.

The reception unit 34 receives information from a communication terminal, and identifies the location of the communication terminal that is a transmission source which transmits a corresponding piece of the information, i.e., the support-provided area 21 in which the transmission source of the information is present. As described above, the communication terminals include mobile terminals such as the vehicle 22 and the mobile information terminal 23 carried by a pedestrian, and the roadside sensor 24. The location information of a communication terminal can be obtained using functionality of the location information acquisition unit 31 provided by MEC. Alternatively, when the communication terminal is a mobile terminal, the reception unit 34 may obtain location information included in the mobile terminal information transmitted from the mobile terminal to identify the support-provided area 21 in which that mobile terminal is present. When the communication terminal is the roadside sensor 24, the reception unit 34 may store in advance information representing a correspondence relationship between network address information of each roadside sensor 24 and the installed location of each roadside sensor 24, since the installed location of the roadside sensor 24 is fixed.

The support information generation units 35 each generate the support information independently on a per-support-provided area 21 basis based on the mobile terminal information and on the roadside detection information from the communication terminals present in a corresponding one of the support-provided areas 21. Specifically, the support information generation units 35 each generate the support information according to the support information generation condition determined by the condition determination unit 36 using the mobile terminal information and the roadside detection information, on a per-support-provided area 21 basis. The support information generation units 35 operate independently on a per-support-provided area 21 basis. The expression "to operate independently" means, for example, to operate using individual processes or threads, or to operate as different virtual machines. In the first embodiment, the support information generation units 35 are illustrated as operating as separate virtual machines correspondingly to the respective support-provided areas 21. The support information generation units 35 that operate on a per-support-provided area 21 basis each have an amount of calculation resource that is set based on the amount of calculation resource calculated by the resource calculation unit 37. Note that when a new support information generation condition is yet to be determined, each corresponding one of the support information generation units 35 (hereinafter referred to simply as the support information generation unit 35) generates support information according to the support information generation condition that has already been determined. In addition, when no support information generation condition has been determined by the condition determination unit 36, the support information generation unit 35 generates the support information according to a support information generation condition that has been set by default.

The support information generation units 35 that operate on a per-support-provided area 21 basis each periodically generate the support information, which is information for supporting running of the vehicle 22 present in the corresponding one of the support-provided areas 21 (hereinafter, that support-provided area 21) based on the mobile terminal information and on the roadside detection information from the communication terminals present in that support-provided area 21. The support information includes dynamic information and control information. The dynamic information is information representing conditions of the movable objects present in that support-provided area 21, and includes the location, the velocity, the size, and the vehicle type of each of the movable objects present in that support-provided area 21. Movable objects to be covered in the dynamic information include not only the vehicle 22, the pedestrian carrying the mobile information terminal 23, and the like, but also a pedestrian not carrying the mobile information terminal 23, an animal, and the like. Information of a pedestrian not carrying the mobile information terminal 23 and information of an animal are obtained from the roadside detection information. The control information is information of travel route recommended for each self-driving vehicle present in that support-provided area 21. The support information generation units 35 that operate on a per-support-provided area 21 basis each generate the support information using a calculation resource reserved by the resource calculation unit 37 on a per-support-provided area 21 basis. In addition, the support information generation units 35 each generate the support information with a period defined in the support information generation condition determined by the condition determination unit 36. The process of generation of the support information includes cases of generation of support information including at least one of the dynamic information and the control information, and also a case of generation of no support information.

The condition determination unit 36 determines a support information generation condition, which is a condition with respect to the support information to be generated and delivered by each corresponding one of the support information generation units 35, based on the type of that support-provided area 21 and on the area situation information of that support-provided area 21. The type of the support-provided area 21 is fixedly specific to each of the support-provided areas 21, and can thus be previously set in the edge server 30. The area situation information includes crowdedness, which is the density of the movable objects present in the support-provided area 21, whether there is a special-purpose vehicle, and the environmental information. The crowdedness of movable objects and whether there is a special-purpose vehicle in the area situation information can be calculated and determined based on the dynamic information generated by the support information generation unit 35. The environmental information can be estimated from the mobile terminal information or from the roadside detection information from the communication terminals present in the support-provided area 21.

Specifically, the condition determination unit 36 determines, for each of the support-provided areas 21, the support information generation condition to be used in the support information generation unit 35 based on the type and on the area situation information of the support-provided area 21, in collaboration with the resource calculation unit 37. The condition determination unit 36 sets the support information generation condition determined, in the support information generation unit 35.

The resource calculation unit 37 calculates the sum of amounts of calculation resource required in the respective support-provided areas 21 and the sum of amounts of communication resource for use between the server device and the mobile terminal to which the support information is to be delivered, based on the support information generation condition determined by the condition determination unit 36. The sum of the amounts of calculation resource calculated and the sum of the amounts of communication resource calculated are hereinafter referred to respectively as total-amount-of-calculation-resource calculation value and total-amount-of-communication-resource calculation value. In addition, when no distinction is made, the total-amount-of-calculation-resource calculation value and the total-amount-of-communication-resource calculation value are hereinafter collectively referred to as total-amount-of-resource calculation value. The resource calculation unit 37 calculates and reserves the amounts of calculation resource and the amounts of communication resource of respective ones of the support-provided areas 21 that do not cause the total-amount-of-calculation-resource calculation value and the total-amount-of-communication-resource calculation value to exceed the sum of the amounts of calculation resource and the sum of the amounts of communication resource each available in all the support-provided areas 21.

Specifically, the resource calculation unit 37 calculates, in collaboration with the condition determination unit 36, the amount of calculation resource and the amount of communication resource assignable to each of the support-provided areas 21, and reserves the amounts of resource calculated. The resource calculation unit 37 calculates the amount of calculation resource and the amount of communication resource based on (A) a calculation resource upper limit value and a communication resource upper limit value, which are respectively the upper limit of the amount of calculation resource and the upper limit of the amount of communication resource available for generation of the support information of all the support-provided areas 21, (B) the priority of each of the support-provided areas 21, and (C) the number of the movable objects which present in each of the support-provided areas 21 and the number of vehicles for which a recommended route is to be generated. When no distinction is made, the calculation resource upper limit value and the communication resource upper limit value each available for generation of the support information of all the support-provided areas 21 are hereinafter collectively referred to as total resource upper limit value. In this respect, the number of the movable objects and the number of vehicles for which a recommended route is to be generated can be calculated based on the dynamic information generated and managed by the support information generation unit 35. In the first embodiment, the total resource upper limit value available in all the support-provided areas 21 and the priority of each of the support-provided areas 21 correspond to priority information, and are preset in the edge server 30 by an administrator of the traffic support system 1. Note that when an actual amount of idle communication resource at that time can be obtained using the network information acquisition unit 32, the actual amount of idle communication resource may be taken into consideration with respect to the communication resource upper limit value. This operation can avoid an event of failure occurred as result of unnecessary reservation of communication resource in a situation in which, for example, a planned amount of communication resource cannot be reserved due to a communication network fault.

The transmission unit 38 transmits the support information generated by the support information generation unit 35 to the mobile terminals present in the support-provided area 21 via the base station 20 corresponding to that support-provided area 21 using a resource for the communication network reserved by the resource calculation unit 37 using the communication resource control unit 33. The transmission unit 38 transmits the support information to each mobile terminal to be supported, with a period specified by the support information generation condition for that support-provided area 21. The resource for the communication network refers to a connection and a bandwidth between the edge server 30 and each destination terminal.

Figure 3:
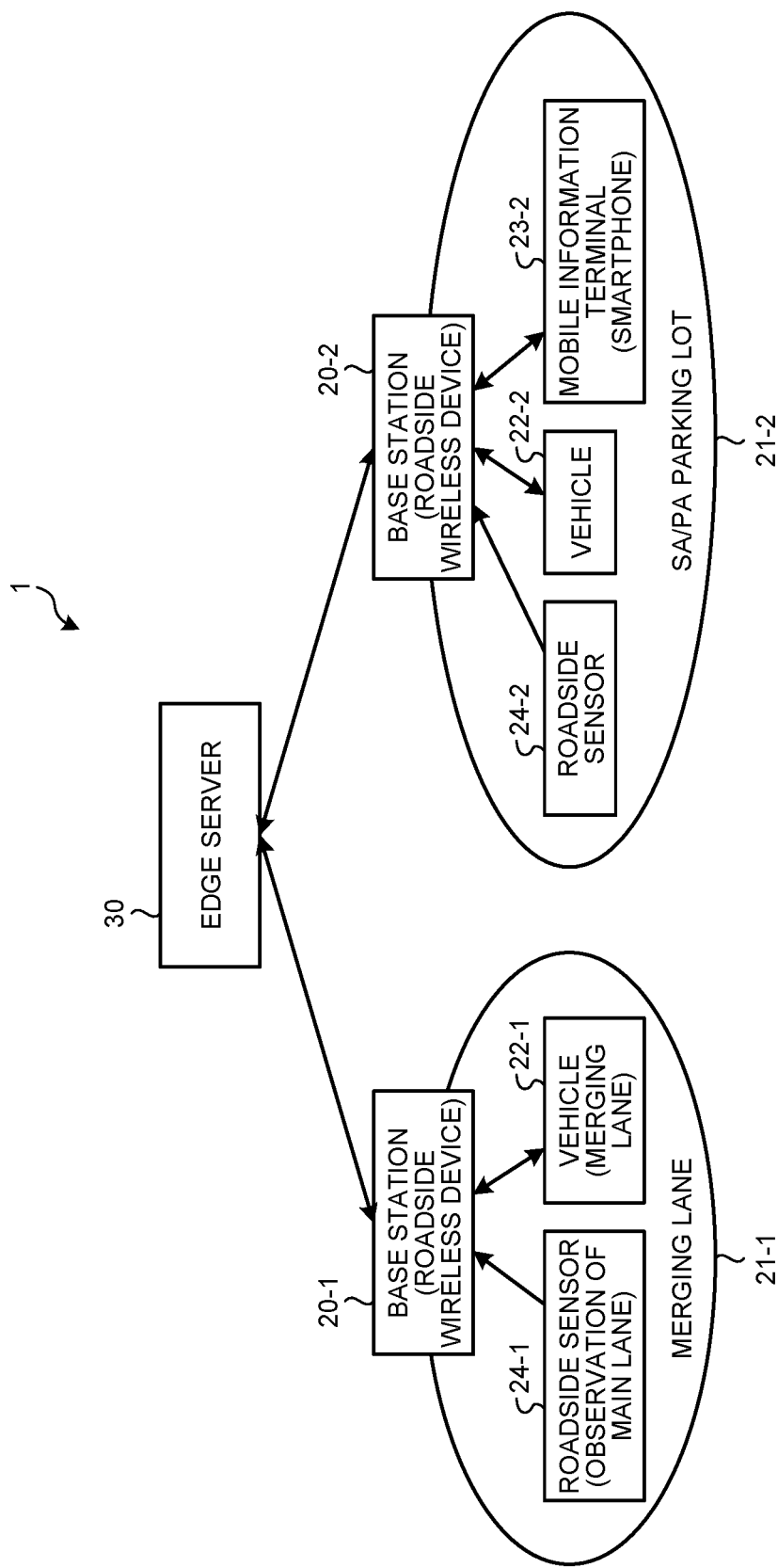
FIG. 3 is a diagram illustrating an example of configuration of the traffic support system according to the first embodiment.

A specific processing procedure of the condition determination unit 36 and of the resource calculation unit 37 will next be described using an example. FIG. 3 is a diagram illustrating an example of configuration of the traffic support system according to the first embodiment. In the example of FIG. 3, the two base stations 20-1 and 20-2 are connected to the edge server 30, and the base stations 20-1 and 20-2 serve the corresponding ones of the support-provided areas 21-1 and 21-2. The support-provided area 21-1 served by the base station 20-1 has a type of merging lane in an expressway, and the support-provided area 21-2 served by the base station 20-2 has a type of parking lot in a service area (indicated by SA in the figure) or in a parking area (indicated by PA in the figure) along an expressway. The support provided with respect to a merging lane exemplified in this example is to provide information about a main lane to the vehicle 22 running along the merging lane. The base station 20-1 is connected to a roadside sensor 24-1 for observing the vehicle 22 running along the main lane, and to a vehicle 22-1 running along the merging lane in the support-provided area 21-1. The base station 20-2 is connected to a roadside sensor 24-2 for observing a vehicle 22-2 in a parking lot in a service area or in a parking area, to the vehicle 22-2 running in the support-provided area 21-2, and to a smartphone, which is a mobile information terminal 23-2, carried by a person present in the support-provided area 21-2.

FIGS. 4 and 5 are each a diagram illustrating an example of condition determination information included in the condition determination unit of the edge server according to the first embodiment. FIG. 4 illustrates an example of condition determination information when the support-provided area 21 has a type of merging lane. FIG. 5 illustrates an example of condition determination information when the support-provided area 21 has a type of parking lot in a service area or in a parking area. In this example, the condition determination information is information including candidate information having desirable periods being stepwise defined based on the state indicated in the area situation information, and is information defined for each type of the support-provided areas 21, where the desirable periods are each a period with which the dynamic information and the control information are desired to be generated and delivered. That is, the condition determination information is information for determining the type and period of the support information to be generated by the support information generation unit 35, and is prepared for each type of the support-provided areas 21. In this respect, the period is a period of generation and a period of delivery of the support information. As illustrated in FIGS. 4 and 5, the condition determination information is information associating, with one another, the area situation information, the state indicated in the area situation information, and a support information generation condition candidate which is a piece of candidate information.

The condition determination information in the case of "merging lane" of FIG. 4 is information that defines support information generation condition candidates based on the "crowdedness of main lane" being the area situation information. This example provides, as the support information generation condition candidates, values of desirable periods, which are generation periods desired to be achieved for the dynamic information and for the control information, in a table format. The dynamic information and the control information each include two values: a minimum desirable period, which is the period that is desired to be achieved in a worst case; and a maximum desirable period, which is the period that is desired to be achieved if possible. In addition, a desirable period value of "0" represents that no information is required for that type. This set of period values defines whether to generate the dynamic information and the control information, and the periods when such information is to be generated.

The condition determination information is set according to a policy of the administrator of the traffic support system 1. For example, the condition determination information indicates that when the crowdedness is "0", that is, when the vehicle 22-1 is not present on the main lane, the dynamic information is desired to be generated with a period of at least one second, and of 100 milliseconds (ms) if possible, and there is no need to generate the control information.

The condition determination information in the case of "parking lot in a service area or in a parking area" of FIG. 5 provides, in a table format, values of desirable periods for the dynamic information and for the control information with respect to a combination of "crowdedness of parking lot" and "whether there is a special-purpose vehicle" each being the area situation information. As described above, the condition determination information may include area situation information formed of a combination of two or more factors of traffic situation such as "crowdedness of parking lot" and "whether there is a special-purpose vehicle", rather than area situation information formed of a single one factor.

Note that the examples of FIGS. 4 and 5 use the classes of crowdedness that are low, medium, and high for simplicity of illustration, but in practice, crowdedness is set in terms of a quantitative numerical range such as the number of vehicles per unit distance.

In this example, the condition determination unit 36 includes condition determination information defined for each type of the support-provided areas 21 as exemplified in FIGS. 4 and 5. In addition, the condition determination unit 36 determines the state in the area situation information of each of the support-provided areas 21 based on the dynamic information managed by the support information generation unit 35, and obtains support information generation condition candidates corresponding to the state in the area situation information determined, from the condition determination information, regarding each of the support-provided areas 21. In this example, the condition determination unit 36 obtains, as the support information generation condition candidates, two classes of desirable periods associated with each of the dynamic information and the control information, for each of the support-provided areas 21.

The resource calculation unit 37 calculates the total-amount-of-resource calculation values, i.e., the total-amount-of-calculation-resource calculation value and the total-amount-of-communication-resource calculation value, based on the support information generation condition candidates obtained for each of the support-provided areas 21, on the number of mobile terminals for which the support information of each of the support-provided areas 21 is to be generated, and on the number of mobile terminals to which the support information of each of the support-provided areas 21 is to be delivered. In this operation, the resource calculation unit 37 selects a combination of classes of desirable periods for each of the support-provided areas 21 that does not cause the total-amount-of-resource calculation value to exceed the total resource upper limit value, which is the total amount of resources available in all the support-provided areas 21.

Processing of the resource calculation unit 37 will next be described in more detail. The resource calculation unit 37 collects two classes of desirable periods associated with each of the dynamic information and the control information for each of the support-provided areas 21, determined by the condition determination unit 36. The resource calculation unit 37 also obtains the number of mobile terminals, each of which is a movable object for which the dynamic information is to be generated, and the number of vehicles for which the control information is to be generated, present in each of the support-provided areas 21, based on the dynamic information generated by the support information generation unit 35 and on the roadside detection information. The resource calculation unit 37 then determines an amount of calculation resource and an amount of communication resource required for information generation at that time for each of the number of movable objects and each of the number of vehicles for which the dynamic information and the control information are to be generated, based on the type and period of data to be generated.

For example, by running of software of the support information generation unit 35 to be operated on a virtual machine in an emulation environment using simulated information of communication terminals, a determination can be made of a minimum amount of calculation resource that allows the processing to be completed within the period. That is, premeasurement enables organization, in a table, of relationships between the number of movable objects and the number of vehicles, and a minimum amount of calculation resource that allows the processing to be completed within the period, and then the table to be stored in the edge server 30. In addition, regarding the amount of communication resource, determination of a set of the type of the support information to be generated, the number of objects for which the support information to be generated, and an update period allows a delivery data rate to be calculated for each delivery destination. Accordingly, a required amount of resources is calculated for each case of the two classes of desirable periods, i.e., the minimum desirable period and the maximum desirable period, associated with each of the dynamic information and the control information for each of the support-provided areas 21, based on the dynamic information managed by the support information generation unit 35.

The resource calculation unit 37 calculates a total-amount-of-communication-resource calculation value in a case where the maximum desirable period is used for all the areas, and determines whether the total-amount-of-communication-resource calculation value is less than or equal to the amount of available resources. The amount of available resources is, by way of example, a total resource amount upper limit value, which is an amount available in all the support-provided areas 21, stored in the edge server 30. When the total-amount-of-communication-resource calculation value corresponding to the maximum desirable periods of all the support-provided areas 21 is less than or equal to the amount of available resources, the resource calculation unit 37 notifies this to the condition determination unit 36, and reserves the amount of resource corresponding to the maximum desirable period. Resource reservation is performed using the communication resource control unit 33 in cases of a communication resource, and is performed through a hypervisor used for virtualization of the support information generation units 35 in cases of a calculation resource.

When the total-amount-of-communication-resource calculation value corresponding to the maximum desirable periods of all the support-provided areas 21 exceeds the amount of available resources, the resource calculation unit 37 changes the required amount of resources corresponding to the maximum desirable period to a required amount of resources corresponding to the minimum desirable period in ascending order of the priority of the support-provided area 21, according to the priority that has been preset to each of the support-provided areas 21. Then, when the total-amount-of-communication-resource calculation value has reached a value less than or equal to the amount of available resources, the resource calculation unit 37 provides the condition determination unit 36 with information corresponding to whether the desirable periods are each the maximum desirable period or the minimum desirable period for each of the support-provided areas 21, and reserves the required amount of resources.

The condition determination unit 36 determines the periods of the support information generation condition candidates in each of the support-provided areas 21 according to the information notified from the resource calculation unit 37, and determines the support information generation condition. In the support information generation condition, the type and period of the support information to be generated by the support information generation unit 35 are determined. The condition determination unit 36 sets the support information generation condition determined, to the support information generation unit 35.

A traffic support method for use by the edge server 30 will now be described. FIG. 6 is a flowchart illustrating an example of procedure of a traffic support method for use in the edge server according to the first embodiment. First, the reception unit 34 receives mobile terminal information and roadside detection information from communication terminals present in each of the support-provided areas 21, and identifies the locations of the communication terminals that have transmitted respective pieces of the mobile terminal information and respective pieces of the roadside detection information (step S11).

Next, the support information generation units 35 generate support information including at least one of dynamic information and control information independently for each of the support-provided areas 21 using the mobile terminal information and the roadside detection information according to the support information generation condition (step S12).

Then, the condition determination unit 36 refers to condition determination information, and obtains, for each of the support-provided areas 21, support information generation condition candidates corresponding to the type and area situation information of the corresponding one of the support-provided areas 21 (step S13). The area situation information can be generated using the dynamic information generated by the support information generation unit 35.

Next, in calculation of the total-amount-of-resource calculation value, the resource calculation unit 37 selects a combination of classes of desirable periods for each of the support-provided areas 21 that does not cause the total-amount-of-resource calculation value to exceed the total resource upper limit value available in all the support-provided areas 21, based on the support information generation condition candidates of each of the support-provided areas 21, and on the number of mobile terminals for which, and the number of mobile terminals to which, the support information of each of the support-provided areas 21 is to be generated and delivered (step S14).

Then, the resource calculation unit 37 sets the amount of calculation resource corresponding to the selected combination of the classes of the desirable periods for each of the support-provided areas 21 to the support information generation unit 35, and reserves the amount of communication resource via the communication resource control unit 33 (step S15).

Next, the condition determination unit 36 assigns the selected combination of the classes of the desirable periods to the support information generation condition candidates of each of the support-provided areas 21, and sets the resulting support information generation condition to the support information generation unit 35 (step S16). Then, the support information generation unit 35 generates support information according to the support information generation condition for the mobile terminals in each of the support-provided areas 21 (step S17). The transmission unit 38 transmits the support information generated, to the mobile terminals in each of the support-provided areas 21 with a period according to the support information generation condition (step S18). The process is thus completed.

As described above, in the first embodiment, the amount of calculation resource and the amount of communication resource are assigned to each of the support-provided areas 21 not to cause the total-amount-of-resource calculated amount of all the support-provided areas 21 to exceed the amount of available resources. More specifically, the amount of calculation resource and the amount of communication resource are assigned to each of the support-provided areas 21, according to the priority that has been preset to each of the support-provided areas 21, not to cause the total-amount-of-resource calculated amount of all the support-provided areas 21 to exceed the total resource upper limit value. This can provide an advantage in reducing or avoiding line congestion and a high load on the server.

Note that when the total-amount-of-resource calculated amount still exceeds the total resource upper limit value even after the desirable periods are reduced to the minimum desirable periods for all the support-provided areas 21, the sum of the required amounts of resources is calculated assuming that data generation is stopped in ascending order of the priority of the support-provided area 21 according to the priority of each of the support-provided areas 21 that has been preset. Then, when the total-amount-of-resource calculation value has reached a value less than or equal to the total resource upper limit value, the edge server 30 determines either to use the minimum desirable periods or to stop data generation for each of the support-provided areas 21, reserves the required amount of resources, and transmits an alarm to the system administrator. The total resource upper limit value and the condition determination information including the desirable periods are usually set to avoid such situation. However, as described above, even when a fault in the communication network hampers reserving of a communication resource that would have been planned, or even when a fault in the edge server 30 hampers reserving of a calculation resource that would have been planned, the first embodiment is advantageous in that the traffic support system 1 can continue operation to the extent possible.

In addition, the first embodiment has been described in which the priority is set on a per-support-provided area 21 basis. However, priority information may be used that is determined by the type and the area situation information of each of the support-provided areas 21. That is, a score corresponding to the priority may be set to the state in the area situation information of each of the support-provided areas 21, in the condition determination information included in the condition determination unit 36. For example, a score is set depending on effectiveness of support such as the expected degree of improvement in safety or smoothness in data delivery when the maximum desirable period is used. This is advantageous in effective utilization of a limited amount of resources also taking into consideration of the situation of each of the support-provided areas 21.

Second Embodiment

The first embodiment has been described in which the total resource upper limit value available in all the areas is set by the administrator of the traffic support system 1. A second embodiment will be described using an example in which the edge server 30 functioning as an MEC server uses an architecture of network function virtualization (NFV) currently being standardized by ETSI, and the resource calculation unit 37 is capable of coordinating the total resource upper limit value with Management and Orchestration (MANO), which functions as an integrated management device. Note that NFV currently being standardized by ETSI will be hereinafter referred to as ETSI NFV.

Figure 7:
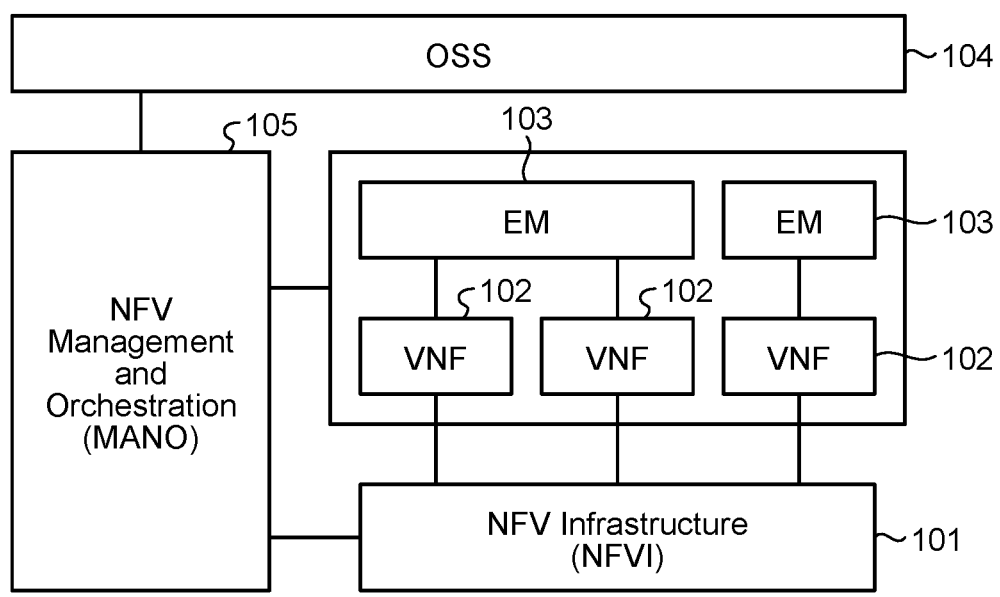
FIG. 7 is a block diagram illustrating an example of architecture of ETSI NFV.

ETSI NFV, which serves as a premise of the present embodiment, will first be briefly described. FIG. 7 is a block diagram illustrating an example of architecture of ETSI NFV. An NFV infrastructure (NFVI) 101 includes hardware resources and a virtualization layer that virtualizes the hardware resources, and provides virtualized resources. Virtualized network functions (VNFs) 102 are each a function implemented using a virtual resource provided by the NFVI 101. Each of these functions is implemented as software to run on one or more virtual machines. MEC employing an NFV architecture manages an application on the MEC server also as one of the VNFs 102. Element managements (EMs) 103 each manage one or more of the VNFs 102. An operations support system (OSS) 104 is an operation support system of a service provider or of a communication operator. The OSS 104 receives a request for generation or termination of an application to be run, or being run, using the edge server 30, and passes the request to NFV MANO 105. The NFV MANO 105 is hereinafter referred to simply as MANO 105. The MANO 105 manages and controls the physical resources and the virtual resources included in the NFVI 101, and performs resource requirement management and life cycle management of the VNFs 102 to integrally manage the applications. Among others, it is required that an interface for requesting the scale of calculation resources that are to be used by the VNFs 102, from the VNFs 102 or the EMs 103 to the MANO 105, be provided as standard between the MANO 105 and the VNFs 102 or the EMs 103.

Figure 8:
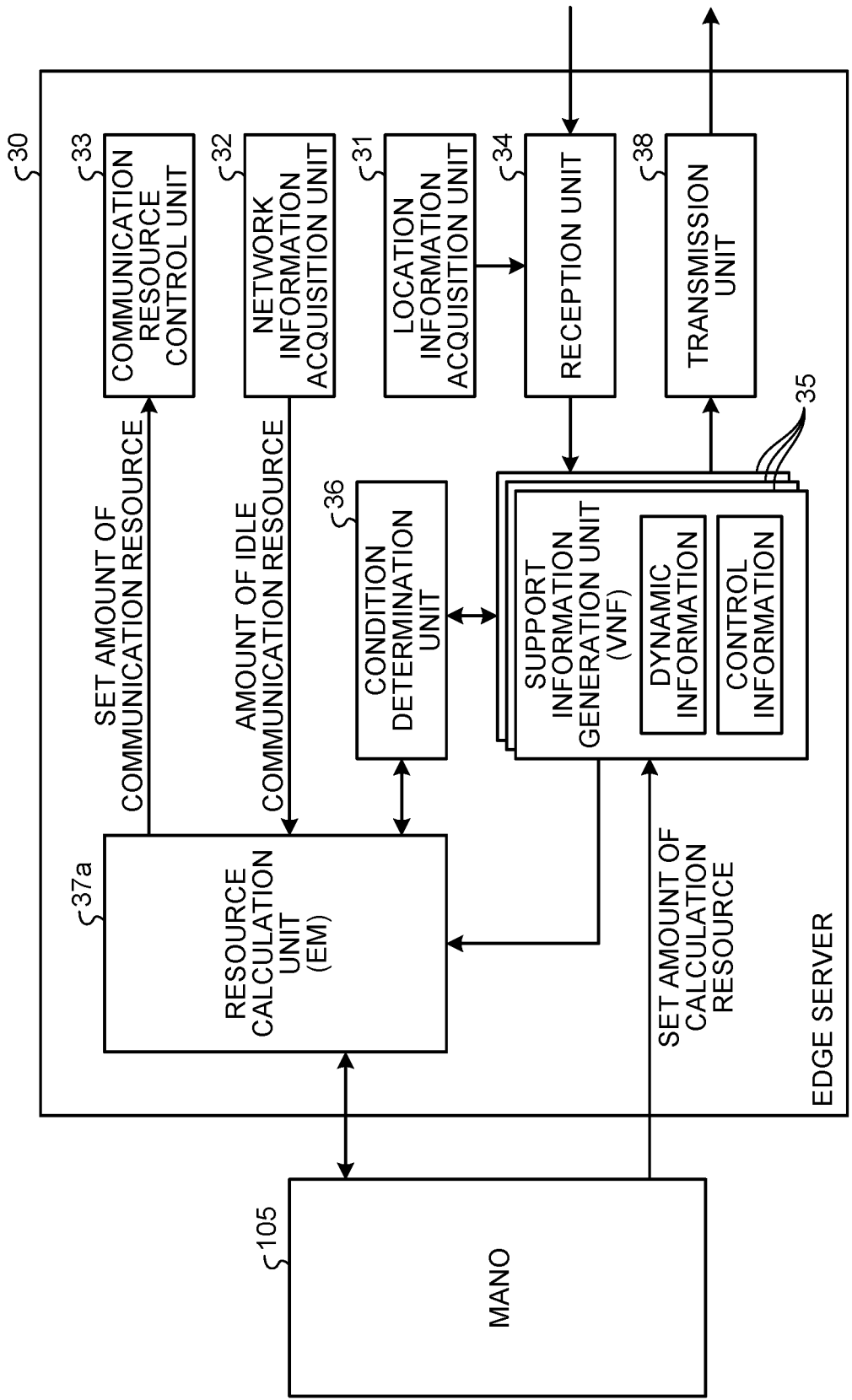
FIG. 8 is a block diagram illustrating an example of functional configuration of the edge server according to a second embodiment.

The traffic support system 1 including the edge server 30 according to the second embodiment is configured similarly to the traffic support system 1 of the first embodiment of FIG. 1. FIG. 8 is a block diagram illustrating an example of functional configuration of the edge server according to the second embodiment. The edge server 30 includes functional units identical to the functional units of the first embodiment, but is connected to the MANO 105, which functions as an integrated management device. The MANO 105 manages and controls the resources included in the edge server 30, and performs life cycle management of functionality implemented on the edge server 30 using a resource. The support information generation units 35 are implemented in software on virtual machines corresponding to the respective support-provided areas 21 similarly to the first embodiment. The support information generation units 35 correspond to the VNFs 102. Meanwhile, in contrast to the first embodiment, a resource calculation unit 37a has functionality of a single one of the EMs 103 supporting multiple ones of the VNFs 102 corresponding to the support information generation units 35. The following description is directed to an operation of the resource calculation unit 37a different from that in the first embodiment, and description of operations of the other functional units will be omitted due to similarity to the first embodiment.

In the second embodiment, when an application of the traffic support system 1 is generated on the edge server 30, the resource calculation unit 37a receives, from the MANO 105, an initial value of the upper limit value of the amount of calculation resource available in the virtual machines on which the software of the support information generation units 35 runs, corresponding to all the support-provided areas 21. That is, the resource calculation unit 37a uses an initial value that has been set by the MANO 105 with respect to the total amount of resources available in all the support-provided areas 21, i.e., the total resource upper limit value. When the application starts to operate after generation of the application, the resource calculation unit 37a determines achievable desirable periods on a per-support-provided area 21 basis similarly to the first embodiment, based on the initial value of the calculation resource upper limit value available received from the MANO 105, and reserves the calculation resource required. Reservation of calculation resource in the second embodiment is to reserve a calculation resource in the virtual machine on which the software of the corresponding one of the support information generation units 35 runs, corresponding to each of the support-provided areas 21. The calculation resource is reserved using the foregoing interface for the scale of VNF calculation resources, provided between the EMs 103 and the MANO 105. In one example, the resource calculation unit 37a includes this interface.

In the second embodiment, the total resource upper limit value available may be changed during operation of the traffic support system 1. Specifically, there may be two cases. One of the cases is that the resource calculation unit 37a requests the MANO 105 to change the total resource upper limit value, and the MANO 105 accepts the change, and the other one of the cases is that the MANO 105 requests the resource calculation unit 37a to change the total resource upper limit value, and the resource calculation unit 37a accepts the change. The former case is, for example, a case in which use of the minimum desirable periods for all the support-provided areas 21 is still insufficient to meet the total-amount-of-calculation-resource calculation value, and the resource calculation unit 37a requests the MANO 105 to make a change. The MANO 105 manages the calculation resource of the edge server 30, and can thus determine whether to accept the request. The latter case is, for example, a case in which resources are insufficient for an application other than the application(s) of the traffic support system 1, and the MANO 105 requests the resource calculation unit 37a of the traffic support system 1 to make a change. The resource calculation unit 37a has the calculation resource upper limit value, which is the amount of available calculation resource, and information about the sum of the amounts of calculation resource that have already been reserved at that time, and can thus determine whether to accept the request from the MANO 105. For example, when the sum of the amounts of calculation resource that have already been reserved is sufficiently less than the calculation resource upper limit value, the resource calculation unit 37a can determine to accept the request. The resource calculation unit 37a then reserves the amount of calculation resource for each of the support-provided areas 21 via the MANO 105.

As described above, in the second embodiment, the calculation resource upper limit value held in the resource calculation unit 37a can be coordinated with the MANO 105 according to the condition of the amount of calculation resource of the edge server 30. This is advantageous in achieving more effective utilization of the calculation resource of the edge server 30.

In addition, the interface relating to the calculation resources of the VNFs 102, specified to be provided as standard between the corresponding one of the EMs 103 (hereinafter, the EM 103) and the MANO 105, is provided for each of the VNFs 102. Use of only such interface requires the MANO 105 to receive a scale request for the calculation resource from each of the VNFs 102 to consider the upper limit when there is an upper limit of the amount of calculation resource available for multiple ones of the VNFs 102 with respect to a single application of the traffic support system 1. In contrast, in the second embodiment, the resource calculation unit 37a functioning as the EM 103 includes, between the EM 103 and the MANO 105, an interface for coordinating the upper limit value of the sum of the amounts of calculation resource available for a same application managed by the resource calculation unit 37a, i.e., available for the multiple ones of the VNFs 102 relating to the traffic support system 1. The EM 103 then holds the upper limit value. This is advantageous in that the scale of the calculation resource can be requested to the MANO 105 after the EM 103 coordinates the amount of calculation resource among the support information generation units 35 functioning as the VNFs 102.

Figure 9:
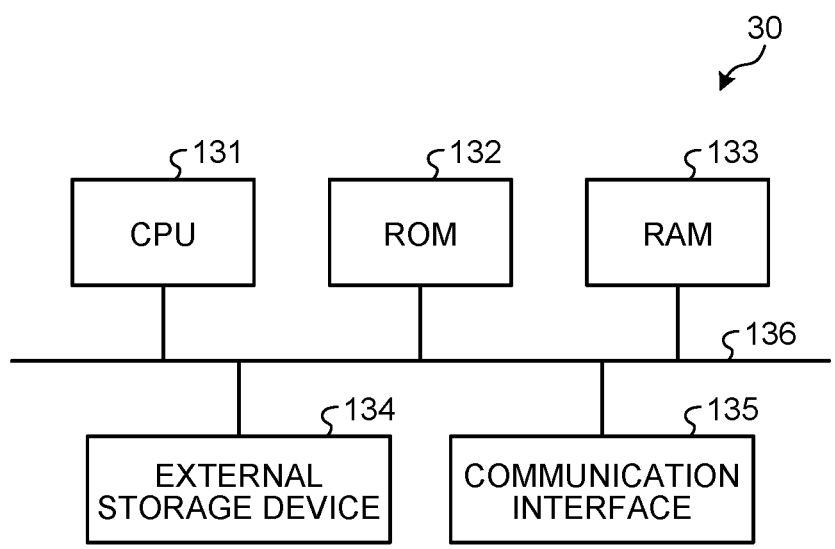
FIG. 9 is a block diagram illustrating an example of hardware configuration of the edge server according to the first and second embodiments.

A hardware configuration of the edge server 30 according to the first and second embodiments will next be described. FIG. 9 is a block diagram illustrating an example of hardware configuration of the edge server according to the first and second embodiments. In one example, the edge server 30 is implemented in a computer. The edge server 30 includes a central processing unit (CPU) 131, which performs various processing tasks; a read-only memory (ROM) 132, which is a non-volatile memory; a random access memory (RAM) 133 including a data storage region; and an external storage device 134 storing a traffic support program, which is a program that implements a traffic support method, and storing various pieces of information. The edge server 30 includes a communication interface 135, which is a connection interface with a device external to the edge server 30. The components of the edge server 30 illustrated in FIG. 9 are connected to one another via a bus 136.

The CPU 131 executes programs stored in the ROM 132 and in the external storage device 134 to govern overall processing and control of the edge server 30. The functionalities of the location information acquisition unit 31, the network information acquisition unit 32, the communication resource control unit 33, the reception unit 34, the support information generation units 35, the condition determination unit 36, the resource calculation units 37 and 37a, and the transmission unit 38 illustrated in FIGS. 2 and 8 are implemented using the CPU 131.

The RAM 133 is used as a work area for the CPU 131. The ROM 132 and the external storage device 134 store programs such as a boot program, a communication program, a data analysis program, and a traffic support program. The external storage device 134 is a hard disk drive (HDD) or a solid state drive (SSD). The programs stored in the ROM 132 and in the external storage device 134 are loaded to the RAM 133. To perform the traffic support methods according to the first and second embodiments, the CPU 131 loads the traffic support program to the RAM 133, and performs various processing tasks. The functionalities of the reception unit 34 and the transmission unit 38 illustrated in FIGS. 2 and 8 are implemented using the communication interface 135.

The traffic support program may be a program stored in a storage medium that is computer readable. The edge server 30 may store the traffic support program stored in the storage medium into the external storage device 134. The storage medium may be a portable storage medium that is a flexible disk, or may be a flash memory, which is a semiconductor memory. The traffic support program may be installed onto a hardware device from another computer or server device via a communication network.

The functionality of the edge server 30 may be implemented in a processing circuitry that is a dedicated hardware element for implementing the traffic support method. The processing circuitry may be a single circuit, a set of multiple circuits, a programmed processor, a parallel programmed processor, an application specific integrated circuit (ASIC), a field-programmable gate array (FPGA), or a combination thereof. The processing circuitry may be implemented partially in a dedicated hardware element and partially in software or firmware. Thus, the processing circuitry can implement the foregoing functionalities using a dedicated hardware element, software, firmware, or a combination thereof.

A server device according to the present disclosure is a server device connected to multiple base stations to deliver information about traffic to mobile terminals in an area served by each of the base stations via that base station, and provides an advantage in capability of reducing or avoiding congestion of a network between the server device and the mobile terminals and generation of a high load of the server device.

The configurations described in the foregoing embodiments are merely examples. These configurations may be combined with a known other technology, and configurations of different embodiments may be combined together. Moreover, part of the configurations may be omitted and/or modified without departing from the spirit thereof.

What is claimed is:

1. A server device connected to one or more base stations to deliver support information to a mobile terminal present in a support-provided area, the support information being information about traffic, the mobile terminal including a vehicle having wireless communication capability, the one or more base stations each having a coverage including the support-provided area being an area in which the support information is provided to the mobile terminal, the server device comprising:
   support information generation circuitry to generate the support information independently for each of the support-provided areas using information from a communication terminal present in each corresponding one of the support-provided areas, wherein at least one of the support-provided areas is associated with candidate information defining respective sets of selectable desirable periods corresponding to different potential situations of the corresponding support-provided area;
   condition determination circuitry to determine a support information generation condition being a condition with respect to the support information to be generated and delivered by the support information generation circuitry, based on area situation information representing a situation of each corresponding one of the support-provided areas; and
   resource calculation circuitry to
      calculate, based on the support information generation condition,
         an amount of calculation resource of each of the support-provided areas; and
         an amount of communication resource of each of the support-provided areas,
      determine for each of the at least one of the support-provided areas, an applicable one of the respective sets of selectable desirable periods based on the corresponding situation represented in the area situation information, and
      select one of the selectable desirable periods from the applicable set as a period with which the support information is desired to be generated and delivered with respect to the corresponding support-provided area,
   wherein the resource calculation circuitry reserves the calculated amounts of calculation resource of the respective support-provided areas for use between the server device and the mobile terminal to which the support information is to be delivered, and
   wherein the resource calculation circuitry reserves the calculated amounts of communication resource of the respective support-provided areas for use between the server device and the mobile terminal to which the support information is to be delivered,
   wherein the resource calculation circuitry calculates the amount of calculation resource of each of the support-provided areas in such manner that a sum of the amounts of calculation resource of the respective support-provided areas does not exceed a total calculation resource upper limit available in all the support-provided areas,
   wherein the resource calculation circuitry calculates the amount of communication resource of each of the support-provided areas in such manner that a sum of the amounts of communication resource of the respective support-provided areas does not exceed a total communication resource upper limit value available in all the support-provided areas, and
   wherein the resource calculation circuitry makes the selection of the selected desirable period for each of the at least one support-provided areas in such manner as to not cause a total resource calculated amount to exceed a total amount of resources available in all the support-provided areas, the total resource calculated amount being a sum of the sum of amounts of calculation resources and the sum of the amounts of communication resources.

2. The server device according to claim 1, wherein the support information includes at least one of dynamic information or control information, the dynamic information including a location, a velocity, and a size of a movable object present in a corresponding one of the support-provided areas, the control information including a travel route recommended for a self-driving vehicle present in the corresponding one of support-provided areas, and
the condition determination circuitry determines, as the support information generation condition, which type or types of information from among the dynamic information and the control information is included in the support information.

3. The server device according to claim 2, wherein the area situation information includes a type of each of the support-provided areas, and a traffic situation including at least one of crowdedness or whether there is a special-purpose vehicle, the crowdedness representing a density of the vehicles present in each of the support-provided areas, the special-purpose vehicle including an emergency vehicle or a priority vehicle, and
the support information generation circuitry generates the support information generation condition on a basis of the type of each of the support-provided areas and on a basis of the traffic situation for each of the support-provided areas.

4. The server device according to claim 3, wherein the condition determination circuitry refers to condition determination information that includes candidate information being defined based on a state indicated in the area situation information and that is defined for each type of the support-provided areas, and obtains, for each of the support-provided areas, a piece of the candidate information corresponding to the type of each of the support-provided areas and to the state indicated in the area situation information, the candidate information including desirable periods defined stepwise, the desirable periods each being a period with which the dynamic information and the control information are desired to be generated and delivered, and the resource calculation circuitry selects a combination of classes of the desirable periods of each corresponding one of the support-provided areas not to cause the total resource calculated amount to exceed the total amount of resources available in all the support-provided areas, based on the candidate information obtained for each of the support-provided areas, on a number of the mobile terminals for which the support information of each of the support-provided areas is to be generated, and on a number of the mobile terminals to which the support information of each of the support-provided areas is to be delivered, when the total resource calculated amount is calculated.

5. The server device according to claim 4, wherein the resource calculation circuitry uses priority information upon selection of the classes of the desirable periods of each of the support-provided areas, the priority information being set for each of the support-provided areas.

6. The server device according to claim 4, wherein the resource calculation circuitry uses, upon selection of the classes of the desirable periods of each of the support-provided areas, priority information determined based on the type of each of the support-provided areas and on the area situation information.

7. The server device according to claim 4, wherein
the resource calculation circuitry includes an interface with an integrated management device that manages and controls a resource of the server device, and performs life cycle management of functionality implemented on the server device using the resource, and
the resource calculation circuitry uses, as an initial value, a value set by the integrated management device with respect to the total amount of resources available in all the support-provided areas, requests the integrated management device to make a change, or is capable of receiving a change request from the integrated management device during operation, and reserves the amount of calculation resource of each of the support-provided areas via the integrated management device.

8. The server device according to claim 5, wherein
the resource calculation circuitry includes an interface with an integrated management device that manages and controls a resource of the server device, and performs life cycle management of functionality implemented on the server device using the resource, and
the resource calculation circuitry uses, as an initial value, a value set by the integrated management device with respect to the total amount of resources available in all the support-provided areas, requests the integrated management device to make a change, or is capable of receiving a change request from the integrated management device during operation, and reserves the amount of calculation resource of each of the support-provided areas via the integrated management device.

9. The server device according to claim 6, wherein
the resource calculation circuitry includes an interface with an integrated management device that manages and controls a resource of the server device, and performs life cycle management of functionality implemented on the server device using the resource, and
the resource calculation circuitry uses, as an initial value, a value set by the integrated management device with respect to the total amount of resources available in all the support-provided areas, requests the integrated management device to make a change, or is capable of receiving a change request from the integrated management device during operation, and reserves the amount of calculation resource of each of the support-provided areas via the integrated management device.

10. A control circuit for controlling a server device connected to one or more base stations to deliver support information to a mobile terminal present in a support-provided area, the support information being information about traffic, the mobile terminal including a vehicle having wireless communication capability, the one or more base stations each having a coverage including the support-provided area being an area in which the support information is provided to the mobile terminal, the control circuit causing the server device to execute process procedures including:
generation of the support information independently for each of the support-provided areas using information from a communication terminal present in each corresponding one of the support-provided areas, wherein at least one of the support-provided areas is associated with candidate information defining respective sets of selectable desirable periods corresponding to different potential situations of the corresponding support-provided area;
determination of a support information generation condition being a condition with respect to the support information to be generated and delivered, based on area situation information representing a situation of each corresponding one of the support-provided areas;
calculation, based on the support information generation condition, of
an amount of calculation resource of each of the support-provided areas, and
an amount of communication resource of each of the support-provided areas;
determination for each of the at least one of the support-provided areas, an applicable one of the respective sets of selectable desirable periods based on the corresponding situation represented in the area situation information;
selection of one of the selectable desirable periods from the applicable set as a period with which the support information is desired to be generated and delivered with respect to the corresponding support-provided area;
reservation of the calculated amounts of calculation resource of the respective support-provided areas for use between the server device and the mobile terminal to which the support information is to be delivered; and
reservation of the calculated amounts of communication resource of the respective support-provided areas for use between the server device and the mobile terminal to which the support information is to be delivered,
wherein the calculation procedure calculates the amount of calculation resource of each of the support-provided areas in such manner that a sum of the amounts of calculation resource of the respective support-provided areas does not exceed a total calculation resource upper limit available in all the support-provided areas, wherein the calculation procedure calculates the amount of communication resource of each of the support-provided areas in such manner that a sum of the amounts of communication resource of the respective support-provided areas does not exceed a total communication resource upper limit value available in all the support-provided areas, and wherein the selection procedure makes the selection of the selected desirable period for each of the at least one support-provided areas in such manner as to not cause a total resource calculated amount to exceed a total amount of resources available in all the support-provided areas, the total resource calculated amount being a sum of the sum of amounts of calculation resources and the sum of the amounts of communication resources.

11. A non-transitory storage medium storing a program for controlling a server device connected to one or more base stations to deliver support information to a mobile terminal present in a support-provided area, the support information being information about traffic, the mobile terminal including a vehicle having wireless communication capability, the one or more base stations each having a coverage including the support-provided area being an area in which the support information is provided to the mobile terminal, wherein the program causes the server device to execute process procedures including:

generation of the support information independently for each of the support-provided areas using information from a communication terminal present in each corresponding one of the support-provided areas, wherein at least one of the support-provided areas is associated with candidate information defining respective sets of selectable desirable periods corresponding to different potential situations of the corresponding support-provided area;

determination of a support information generation condition being a condition with respect to the support information to be generated and delivered, based on area situation information representing a situation of each corresponding one of the support-provided areas;

calculation, based on the support information generation condition, of
an amount of calculation resource of each of the support-provided areas, and
an amount of communication resource of each of the support-provided areas;

determination for each of the at least one of the support-provided areas, an applicable one of the respective sets of selectable desirable periods based on the corresponding situation represented in the area situation information;

selection of one of the corresponding selectable desirable periods as a period with which the support information is desired to be generated and delivered with respect to the corresponding support-provided area;

reservation of the calculated amounts of calculation resource of the respective support-provided areas for use between the server device and the mobile terminal to which the support information is to be delivered; and reservation of the calculated amounts of communication resource of the respective support-provided areas for use between the server device and the mobile terminal to which the support information is to be delivered, wherein the calculation procedure calculates the amount of calculation resource of each of the support-provided areas in such manner that a sum of the amounts of calculation resource required of the respective support-provided areas does not exceed a total calculation resource upper limit available in all the support-provided areas, wherein the calculation procedure calculates the amount of communication resource of each of the support-provided areas in such manner that a sum of the amounts of communication resource of the respective support-provided areas does not exceed a total communication resource upper limit value available in all the support-provided areas, and wherein the selection procedure makes the selection of the selected desirable period for each of the at least one support-provided areas in such manner as to not cause a total resource calculated amount to exceed a total amount of resources available in all the support-provided areas, the total resource calculated amount being a sum of the sum of amounts of calculation resources and the sum of the amounts of communication resources.

12. A traffic support method for use in a server device connected to one or more base stations to deliver support information to a mobile terminal present in a support-provided area, the support information being information about traffic, the mobile terminal including a vehicle having wireless communication capability, the one or more base stations each having a coverage including the support-provided area being an area in which the support information is provided to the mobile terminal, the traffic support method comprising:

generating the support information independently for each of the support-provided areas using information from a communication terminal present in each corresponding one of the support-provided areas, wherein at least one of the support-provided areas is associated with candidate information defining respective sets of selectable desirable periods corresponding to different potential situations of the corresponding support-provided area;

determining a support information generation condition being a condition with respect to the support information to be generated and delivered, based on area situation information representing a situation of each corresponding one of the support-provided areas; and calculating, based on the support information generation condition,
an amount of calculation resource of each of the support-provided areas, and
an amount of communication resource of each of the support-provided areas;

determining for each of the at least one of the support-provided areas, an applicable one of the respective sets of selectable desirable periods based on the corresponding situation represented in the area situation information;

selecting one of the selectable desirable periods from the applicable set as a period with which the support information is desired to be generated and delivered with respect to the corresponding support-provided area;

reserving the calculated amounts of calculation resource of the respective support-provided areas for use between the server device and the mobile terminal to which the support information is to be delivered; and reserving the calculated amounts of communication resource of the respective support-provided areas for use between the server device and the mobile terminal to which the support information is to be delivered, wherein the calculating step calculates the amount of calculation resource of each of the support-provided areas in such manner that a sum of the amounts of the respective support-provided areas does not exceed a total calculation resource upper limit available in all the support-provided areas, wherein the calculating step calculates the amount of communication resource of each of the support-provided areas in such manner that a sum of the amounts of communication resource of the respective support-provided areas does not exceed a total communication resource upper limit value available in all the support-provided areas, and wherein the selecting step makes the selection of the selected desirable period for each of the at least one support-provided areas in such manner as to not cause a total resource calculated amount to exceed a total amount of resources available in all the support-provided areas, the total resource calculated amount being a sum of the sum of amounts of calculation resources and the sum of the amounts of communication resources.

* * * * *